H. MUELLER.
LIQUID SHUT-OFF.
APPLICATION FILED MAY 21, 1906.

934,620.
Patented Sept. 21, 1909.

Witnesses.
Ira C. Graham
Nora Graham

Inventor
Henry Mueller
by L. R. Graham
his attorney

UNITED STATES PATENT OFFICE.

HENRY MUELLER, OF DECATUR, ILLINOIS, ASSIGNOR TO H. MUELLER MANUFACTURING COMPANY, OF DECATUR, ILLINOIS, A CORPORATION OF ILLINOIS.

LIQUID SHUT-OFF.

934,620.   Specification of Letters Patent.   Patented Sept. 21, 1909.

Application filed May 21, 1906. Serial No. 318,095.

*To all whom it may concern:*

Be it known that I, HENRY MUELLER, a resident of the city of Decatur, in the county of Macon and State of Illinois, have invented certain new and useful Improvements in Liquid Shut-Offs, of which the following is a specification.

The principal object of this invention is to prevent hammering, or chattering, of the valves in shut-offs controlling liquids under pressure and a secondary object is to provide means for preventing rubber valves from expanding out of operative shape.

The invention is exemplified in the structure hereinafter described and it is defined in the appended claims.

Figure 1:
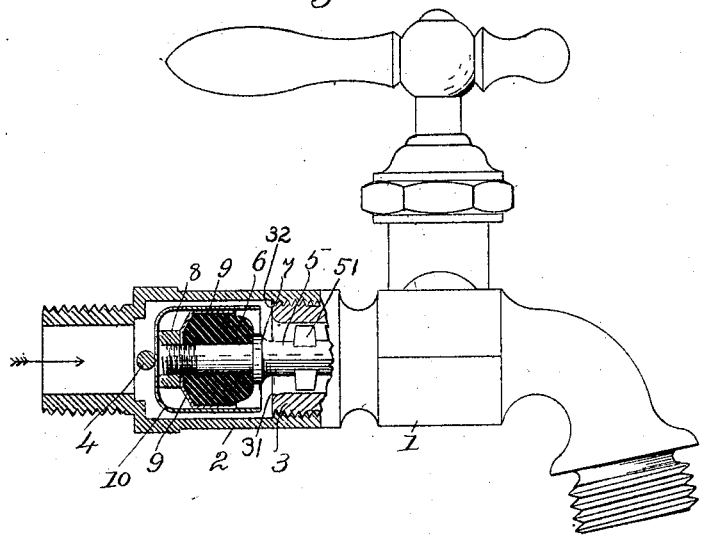
Figure 2:
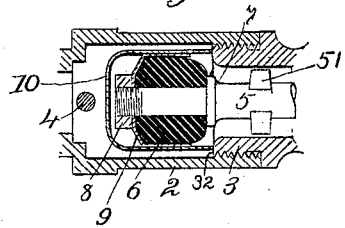
Figure 3:
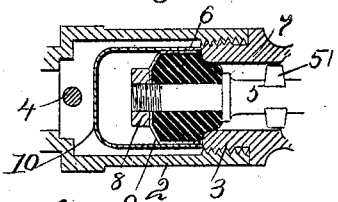
Figure 4:
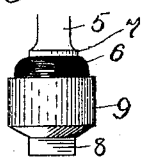
Figure 5:
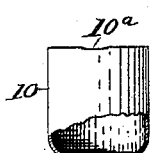

In the drawings forming part of this specification Figure 1 is an elevation of a Fuller bib cock embodying my invention, a part of the cock being shown in section to expose essential elements. Figs. 2 and 3 are sections lengthwise through that part of the cock that incloses the embodiment of my invention, the valve being shown partly closed in Fig. 2 and completely closed in Fig. 3. Fig. 4 is an elevation of a rubber valve incased in accordance with my invention. Fig. 5 is a detail of the cup which forms an essential element of my invention.

The cock body 1 is herein shown as of the Fuller type comprising two members of which the outer one 3 screws into the inner one 2 so as to leave a flat shoulder 31 projecting inwardly at the inner end of said outer member and a rounded valve seat 32 at the inner corner of said shoulder, and the stem 5 leads from the usual crank or eccentric on the handle shaft through said member 3 (within which it may have lugs 51 to guide it in its motion) and through the Fuller ball 6—the latter being held in place between a collar 7 on the stem and a nut 8 screwed onto the threaded extremity thereof, as will be well understood. The inlet of water is indicated by the arrow, and it will be clear that by turning the handle the working end of the ball will be drawn against and compressed upon the valve seat 32 and projected slightly into the bore of the member 3 so as to close the cock and shut off the flow of liquid. In the forward movement of this ball the crank or eccentric on the handle shaft may cause the stem to swing slightly over a fulcrum formed by said lugs, but the elasticity of the working end of the ball will permit it to adapt itself to and press slightly through the valve seat 32.

An important although not essential part of the present invention consists in providing means for preventing the expansion of the rear portion and body of said ball, as the nut 8 is tightened up from time to time on account of wear which takes place at its working end. This consists in a cylindrical shell 9, preferably of thin metal, closely surrounding the body of the ball except at its working end which is left exposed; and said shell is held upon the ball in any suitable manner, for instance by having its inner end cupped as shown herein and clamped upon the stem 5 beneath the nut 8. In any event, the shell moves backward and forward with the ball, and when the valve is in closed position as shown in Fig. 3 the front end of the shell need not contact with the valve seat 32 or shoulder 31.

That much of the invention thus far described would produce a Fuller cock having a ball incased by an adjustable shell whose setting up would prolong its life and permit it to close reliably until the working end of the ball became worn to such an extent that the front end of the shell contacted with the shoulder 31. But it is well known to those skilled in this art that, especially where the valve closes against its seat with some obliquity as in a Fuller cock, a certain hammering or chattering takes place, and this it is the object of the present invention to avoid. Broadly speaking, I accomplish this end by loosely surrounding the ball with a cup whose irregular open end contacts with the shoulder before the ball strikes its seat, whereby the inflowing water is partly shut off in advance of the complete closure of the cock. The details of this principal portion of the present invention will now be described.

Mounted loosely within the member 2 and out of contact with its inner wall is a cup whose closed end 10$^b$ stands in rear of the nut 8 and abuts against a fixed stop 4 when the valve is open, as shown in Fig. 1, and whose cylindrical wall 10 rather closely but yet loosely surrounds the ball 6 of the shell 9 if the latter be employed The open end of this cup is formed irregular as by having openings, indentations, or by preference notches 10ª in its wall, so that when the cup is moved forward said open end in striking the flat shoulder 31 will not make a tight closure thereupon. If this improved form of shut off is used with a Fuller cock, as herein illustrated, the obliquity of movement of the stem 5 will itself cause one side of the front edge of the wall 10 to strike the shoulder before the other side contacts therewith; but in order to be perfectly certain that the open end of the cup does not make tight contact with the shoulder, I prefer to make it irregular as stated. The cup is of sufficient length to have some play longitudinally upon the ball, its movement in one direction being limited by contact with the nut 8 and in the other direction by contact with the stop 4. Its fit around the ball (or its shell 9) is as close as a free sliding connection will permit, whereby a sufficient amount of water may pass into or out of this cup for the purposes of the present invention and yet its passage will be restricted. Preferably the construction of parts is such that about the same amount of water will pass between the valve and the cup as that permitted to pass between the latter and the shoulder, although strict accuracy in this regard is not essential.

In operation the parts stand with the valve open about as seen in Fig. 1, and the water is flowing through the cock in the direction of the arrow. In closing the shut off, the first movement of the handle shaft draws the valve toward its seat and carries the cup with it by reason of the fact that the inlet to the space between the valve and the bottom of the cup is restricted and there is a tendency to form a vacuum therein. The parts are shown with the cock partly closed in Fig. 2, wherein this first movement has carried the front end of the cup into contact with the flat shoulder 31, but its oblique position or the irregularity or notches 10ª prevent tight closing against said shoulder, and therefore yet permit the passage of a small amount of water from the inlet, around the cup, past the shoulder and valve seat, and out through the shut off. Further movement of the handle shaft finally carries the parts to the position shown in Fig. 3, and during this movement the valve has been drawn forward within the cup. This movement of the valve tends to create a vacuum behind it within the closed body of the cup, and such vacuum sucks in water through the restricted space between them and retards the final closing of the valve. As shown in this view, when the working end of the ball 6 closes against its seat 32 and is drawn partially thereinto, it also shuts off the small passage between the end of the cup and the shoulder, and therefore serves to reliably and completely close the cock. A reverse movement of parts obviously first carries them from the position shown in Fig. 3 to the rear until the bottom 10ᵇ of the cup strikes the stop 4, after which the continued movement of the handle shaft will slide the ball rearwardly within the cup and slowly expel the water accumulated between them in a manner which will be clear. As the ball and cup leave the seat and shoulder simultaneously, the cock will be opened quickly; but further movement of the handle shaft to restore the parts to their initial position shown in Fig. 1 will be retarded by the slow expulsion of the water through said restricted passage between the ball and cup. If a Fuller cock is used, it is possible that the obliquity of the stem will be sufficient to avoid the necessity for irregularity of or openings in the wall of the cup, but by preference I always employ them so as to make the action of the shut off positive. In any event, they are forward of the front end of the shell if it is employed, and hence the working end of the ball serves as a shut off for them as it closes against its seat. This explanation is given in order to distinguish from the possible location in the cup of openings or notches deep enough to interfere with its rather close fit around the shell or to destroy the vacuum which is essential to the retarded movement of parts as above explained.

What is claimed as new is:

1. In a liquid shut off, the combination with a passage-way having a flat internal shoulder with its inner corner rounded and forming a valve seat, and a soft valve movable away from said seat and to and partly into it; of a member having a wall fitting closely but slidably around the valve with a restricted passage between them, its front end which engages said shoulder being irregular, said member being moved yieldingly by and with the movements of the valve, for the purpose set forth.

2. In a liquid shut off, the combination with a passageway having an internal shoulder with its corner forming a valve seat, and a soft valve movable away from said seat and to and partly into it; of a member having a wall around the valve with a restricted passage between them, its front end which engages said shoulder being notched, said member being moved yieldingly by the movement of the valve, for the purpose set forth.

3. In a liquid shut off, the combination with a passageway having an internal shoulder with its inner corner forming a valve seat, and a Fuller stem having a soft valve movable away from said seat and to and partly into it; of a member having a wall around the valve with a restricted passage between them, its front end closing obliquely against said shoulder, said member being moved yieldingly by the movements of the valve, for the purpose set forth.

4. In a liquid shut off, the combination with a passageway having an internal shoulder surrounding a valve seat, a stem passing therethrough, means for moving it longitudinally and for rocking it slightly, and a soft ball valve adapted in seating to pass the shoulder; of a cylindrical member having a wall loose in said passageway and fitting slidably around the valve, the front end of the wall engaging said shoulder before the valve closes against and enters its seat, for the purpose set forth.

5. In a liquid shut off, the combination with a passageway having an internal shoulder surrounding a valve seat, a stem, means for moving it longitudinally and for rocking it slightly, and a soft valve adapted in seating to pass the shoulder; of a cylindrical member having a wall loose in said passageway and fit frictionally around the valve so as to be moved yieldingly with the valve, the front end of the wall engaging said shoulder before the valve closes against and enters its seat, for the purpose set forth.

6. In a liquid shut off, the combination with a cock body having a passageway with an internal shoulder surrounding a valve seat, a stop within the larger portion of the passageway, and a Fuller valve stem projecting through the seat and smaller portion of the passageway and having lugs within the latter; of a ball carried by the stem with its working end adapted to close upon and be drawn slightly into said seat, a cylindrical member having a wall fitting slidably around the ball and shorter than the distance between said stop and shoulder, said member being moved yieldingly with and in advance of the ball until it strikes either the stop or the shoulder, for the purpose set forth.

7. In a liquid shut off, the combination with a passageway having a valve seat and a surrounding shoulder; of a stem projecting through the seat, a soft valve on the stem adapted to close against said seat, and a cup fitting slidably around the valve and movable longitudinally in said passageway, the cup having one end closed behind the valve whereby it is held thereon by suction only and having a body longer than the valve whereby its open end will strike said shoulder before the valve strikes its seat, said open end being irregular, for the purpose set forth.

8. In a liquid shut off, the combination with a passageway having a valve seat and a surrounding shoulder; of a stem projecting through the seat, a soft valve on the stem adapted to be closed against said seat, and a cup fitting slidably around the valve and movable longitudinally in said passageway, the cup having a body longer than the valve whereby its open end will strike said shoulder before the valve strikes its seat, said body having radial openings at its open end, for the purpose set forth.

9. In a liquid shut off, the combination with a passageway having a valve seat and a surrounding shoulder; of a stem projecting through the seat, a soft valve on the stem adapted to be closed against said seat, and a cup fitting slidably around the valve and movable longitudinally in said passageway, the cup having a body longer than the valve whereby its open end will strike said shoulder before the valve strikes its seat, the mouth of said open end being notched, for the purpose set forth.

10. In a liquid shut off, the combination with a passageway having a valve seat and a surrounding shoulder; of a ball valve whose working end is adapted to seat against said shoulder, a metal shell secured around the body of the ball in rear of said working end, and a member fitting slidably around the shell where it embraces said body and adapted to project beyond it around the working end of the ball, the projecting end of said member having openings in its wall.

11. In a liquid shut off, the combination with a passageway having a valve seat and a surrounding shoulder; of a ball valve whose working end is adapted to seat against said shoulder, and a cup-shaped member fitting slidably around said body and adapted to project beyond it around the working end of the ball, the projecting end of said member having notches in the extremity of its wall.

12. In a liquid shut off, the combination with a passageway having a valve seat and a surrounding shoulder; of a stem projecting through the seat, a soft valve on the stem adapted to be closed against said seat, a metal shell encircling said soft valve except at its working end, and a cup fitting slidably around the shell and movable longitudinally in said passageway, the cup having a body longer than the valve whereby its open end will strike said shoulder before the valve strikes its seat, said open end being notched, for the purpose set forth.

In testimony whereof I sign my name in the presence of two subscribing witnesses.

HENRY MUELLER.

Witnesses:
J. H. McEvoy,
John L. Waddell.